(12) United States Patent
Fujimoto et al.

(10) Patent No.: US 10,263,493 B2
(45) Date of Patent: Apr. 16, 2019

(54) VIBRATORY SIEVING MACHINE

(71) Applicant: Kabushiki Kaisha Kinki, Hyogo (JP)

(72) Inventors: Shinya Fujimoto, Hyogo (JP); Junichi Asakura, Hyogo (JP); Mitsuhiro Aota, Hyogo (JP); Hiroaki Kajiyama, Hyogo (JP); Naoya Wada, Hyogo (JP)

(73) Assignee: KABUSHIKI KAISHA KINKI, Hyogo (JP)

( * ) Notice: Subject to any disclaimer, the term of this patent is extended or adjusted under 35 U.S.C. 154(b) by 411 days.

(21) Appl. No.: 14/783,098

(22) PCT Filed: Apr. 14, 2014

(86) PCT No.: PCT/JP2014/060584
§ 371 (c)(1),
(2) Date: Oct. 8, 2015

(87) PCT Pub. No.: WO2014/171416
PCT Pub. Date: Oct. 23, 2014

(65) Prior Publication Data
US 2016/0056685 A1 Feb. 25, 2016

(30) Foreign Application Priority Data

Apr. 15, 2013 (JP) ................. 2013-085055

(51) Int. Cl.
*H02K 7/075* (2006.01)
*B06B 1/16* (2006.01)
(Continued)

(52) U.S. Cl.
CPC ............. *H02K 7/061* (2013.01); *B06B 1/166* (2013.01); *B07B 1/42* (2013.01); *H02K 33/00* (2013.01)

(58) Field of Classification Search
CPC ...................... H02K 7/061; B06B 1/16–1/168
(Continued)

(56) References Cited

U.S. PATENT DOCUMENTS 3,948,354 A * 4/1976 Fosse ..................... F16N 7/366
184/6.16
4,108,009 A * 8/1978 Fuchigami .............. B06B 1/162
74/61
(Continued)

FOREIGN PATENT DOCUMENTS

JP 6-294124 10/1994
JP 9-38575 2/1997
(Continued)

OTHER PUBLICATIONS

Machine Translation, Suzuki, JP 09078579 A, Mar. 1997.*
International Search Report dated Jul. 8, 2014 in International (PCT) Application No. PCT/JP2014/060584.

*Primary Examiner* — Thomas Truong
(74) *Attorney, Agent, or Firm* — Wenderoth, Lind & Ponack, L.L.P.

(57) ABSTRACT

In a vibratory sieving machine having two rotary shafts provided with eccentric spindles disposed parallel to each other, motors are disposed so as to reduce the capacity or power consumption of the motors required in the vibratory sieving machine, and to drive the two rotary shafts independently, and a rotary drive control mechanism is configured such that either one of the two rotary shafts can be started upon a start, while the other of the two rotary shafts can be started after a rotary drive state of the one of the two rotary shafts is transferred to a stationary state.

4 Claims, 10 Drawing Sheets

(51) Int. Cl.
*H02K 33/00* (2006.01)
*H02K 7/06* (2006.01)
*B07B 1/42* (2006.01)

(58) Field of Classification Search
USPC .......................................... 310/81, 112, 114
See application file for complete search history.

(56) References Cited

U.S. PATENT DOCUMENTS

| | | | | | |
|---|---|---|---|---|---|
| 4,255,254 | A | * | 3/1981 | Faust | ...................... B06B 1/166 |
| | | | | | 198/770 |
| 4,749,891 | A | * | 6/1988 | Sheng | ...................... B07B 1/40 |
| | | | | | 310/15 |
| 4,793,196 | A | * | 12/1988 | Davis | ...................... B06B 1/166 |
| | | | | | 74/61 |
| 2007/0116577 | A1 | | 5/2007 | Chen et al. | |

FOREIGN PATENT DOCUMENTS

| | | | |
|---|---|---|---|
| JP | 9-78579 | | 3/1997 |
| JP | 09078579 | A * | 3/1997 |
| JP | 10-18288 | | 1/1998 |
| JP | 11-182414 | | 7/1999 |
| JP | 2001-25293 | | 1/2001 |
| JP | 2003-300019 | | 10/2003 |
| JP | 2007-149084 | | 6/2007 |

* cited by examiner

FIG.6(a-1)    FIG.6(a-2)    FIG.6(a-3)
Eccentric spindle 1   Eccentric spindle 2   Eccentric spindle 3

VIBRATORY SIEVING MACHINE

TECHNICAL FIELD

The present invention relates to a vibration generating apparatus, and more particularly to a vibration generating apparatus having two rotary shafts each provided with an eccentric spindle disposed parallel to each other.

BACKGROUND ART

Conventionally, in the vibration generating machine or vibratory pile driving machine of this type, or the like, it has been general to use a vibration generating machine designed to generate vibrations by rotating rotary shafts having eccentric spindles (see, for example, Japanese Patent Publication 2003-300019 and Japanese Patent Publication 10-18288).

Incidentally, it is realized by various mechanisms as disclosed, for example, such as the one having one rotary shaft provided with an eccentric spindle as disclosed in Japanese Patent Publication 2003-300019, or the one having two rotary shafts parallel to each other having eccentric spindles as disclosed in Japanese Patent Publication 10-18288, or the one having a plurality of sets thereof.

The mechanism having two rotary shafts provided with eccentric spindle disposed parallel to each other is capable of setting the direction of vibration to be generated in a desired direction, and for example, in the mechanism disclosed in Japanese Patent Publication 10-18288, by cancelling the vibrations in the horizontal direction between two rotary shafts, it is intended to generate the vibration in the perpendicular direction only.

Problems to be Solved by the Invention

For instance, the vibration generating machine having two rotary shafts provided with eccentric spindles disposed parallel to each other has an advantage of determining the direction of the vibration to be generated in a specific direction, but is known to have problems of increasing the motor capacity and the power consumption required to rotate and drive the two rotary shafts provided with eccentric spindles.

SUMMARY OF THE INVENTION

The present invention relates to the problems of the conventional vibration generating machine having two rotary shafts provided with eccentric spindles disposed parallel to each other, and it is a primary object thereof to present a vibration generating machine capable of reducing the required motor capacity or the power consumption.

Means for Solving the Problems

In order to achieve the object, the vibration generating machine in a first aspect of the invention relates to a vibration generating machine having two rotary shafts provided with eccentric spindles disposed parallel to each other, in which motors are disposed so that the two rotary shafts may be driven independently, and a rotary drive control mechanism is constituted so that either one of the two rotary shafts is started upon start, while the other rotary shaft is started after the rotary drive state of this rotary shaft is transferred to a stationary state.

Herein, the expression that after the rotary drive state of this rotary shaft is transferred to a stationary state refers to the moment of reaching the state when the power consumption of the motor suddenly elevates when one rotary shaft is started, and then declines gradually, and converges on a nearly constant value when the rotating speed reaches a predetermined rotating speed.

To achieve the same object, the vibration generating machine in a second aspect of the invention relates to a vibration generating machine having two rotary shafts provided with eccentric spindles disposed parallel to each other, in which motors are disposed so that the two rotary shafts may be driven independently, and a rotary drive control mechanism is constituted so that transmission of rotary drive force to either one of the two rotary shafts is suspended after the rotary drive state of the two rotary shafts is transferred to a stationary state, and that the rotary shaft having suspended the transmission of the rotary drive force is rotated along with cooperation of the other rotary shaft vibrated by the generation of the rotary drive of the other rotary shaft.

Herein, the expression that after the rotary drive state of this rotary shaft is transferred to a stationary state refers to the moment of reaching the state when the power consumption of the motor suddenly elevates when the rotary shaft is started, and then declines gradually, and converges on a nearly constant value when the rotating speed reaches a predetermined rotating speed.

In this case, selection of the rotary shaft for suspending transmission of rotary drive force may cause to create a difference in the angle of vibrating direction.

As the eccentric spindle, a rectangular eccentric spindle may be used.

It is also possible to supply lubricating oil into the bearing of the rotary shaft from the reserve unit of the lubricating oil by way of a vibration pump.

Effects of the Invention

According to the vibration generating machine of the first aspect of the invention, in the vibration generating machine having two rotary shafts each provided with an eccentric spindle disposed parallel to each other, motors are disposed so that the two rotary shafts may be driven independently, and a rotary drive control mechanism is constituted so that transmission of rotary drive force to either one of the two rotary shafts is suspended after the rotary drive state of the two rotary shafts is transferred to a stationary state, and that the rotary shaft having suspended the transmission of the rotary drive force is rotated along with cooperation of the other rotary shaft vibrated by the generation of the rotary drive of the other rotary shaft, and therefore the power consumption of the motors is saved.

According to the vibration generating machine of the second aspect of the invention, in the vibration generating machine having two rotary shafts each provided with an eccentric spindle disposed parallel to each other, motors are disposed so that the two rotary shafts may be driven independently, and a rotary drive control mechanism is constituted so that transmission of rotary drive force to either one of the two rotary shafts is suspended after the rotary drive state of the two rotary shafts is transferred to a stationary state, and that the rotary shaft having suspended the transmission of the rotary drive force is rotated along with cooperation of the other rotary shaft vibrated by the generation of the rotary drive of the other rotary shaft, and therefore By selection of the rotary shaft for suspending transmission of rotary drive force, it may cause to create a difference in the angle of vibrating direction, and therefore in the vibratory sieving machine, for example, the transfer prior sieving operation and the sieving prior sieving operation can be selectively done, so that the sieving operation may be done efficiently.

As the eccentric spindle, by using a rectangular eccentric spindle, as compared with the semicircular eccentric spindle conventionally used widely, the volume of the peak of the motor required to start the rotary shaft can be reduced, and selection of the rotary shaft for suspending transmission of rotary drive force may cause to create a difference in the angle of vibrating direction.

By supplying lubricating oil into the bearing of the rotary shaft from the reserve unit of the lubricating oil by way of a vibration pump, without requiring another power source, the vibration generated by the vibration generating machine can be used as the driving source, and the lubricating oil can be supplied to the bearing of the rotary shaft. Hence there is no energy loss in the case of supplying the lubricating oil by using a lubricating oil collar, and the power consumption of the motor can be saved.

BRIEF DESCRIPTION OF THE DRAWINGS

FIG. 6 (*a*-1) to (*a*-3) are exemplary diagrams showing shapes of various eccentric spindles, and (*b*) is a graph showing the relationship between the eccentric spindles and power consumption.

BEST MODE FOR CARRYING OUT THE INVENTION

Hereinafter, an embodiment of the vibration generating machine of the invention is described specifically while referring to the accompanying drawings.

Embodiment 1

Figure 1:
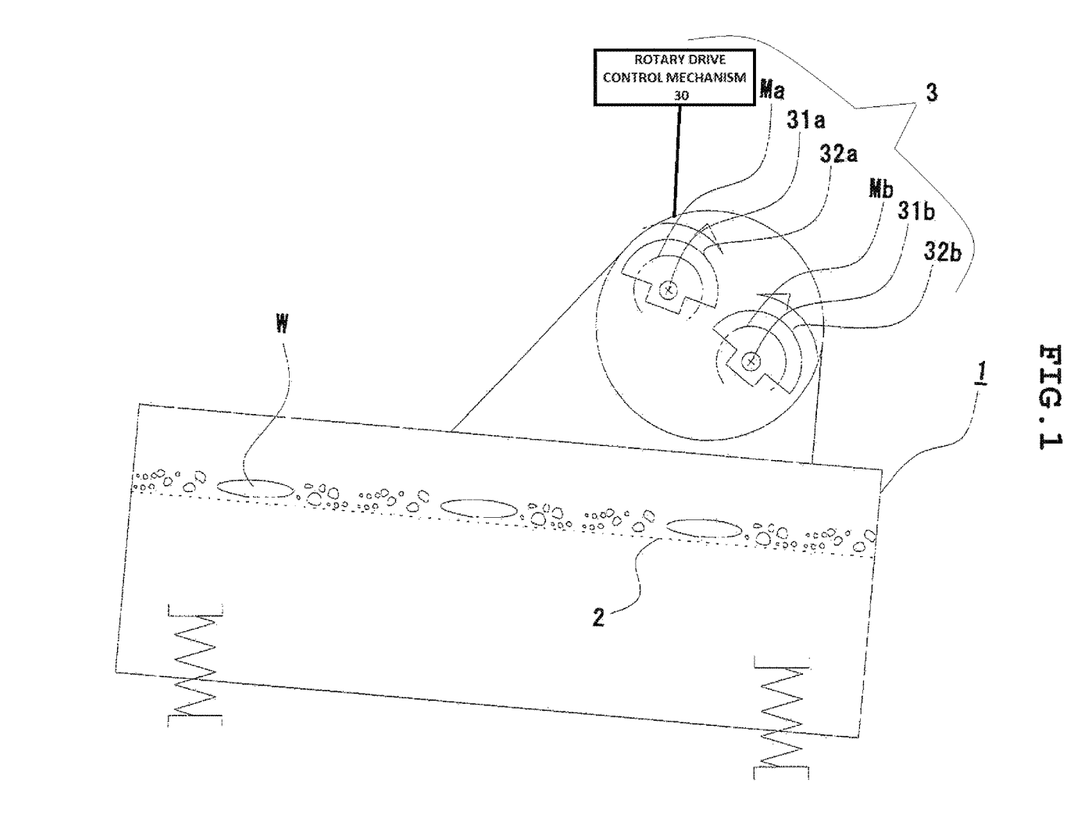
FIG. 1 is a front view showing an embodiment of a vibratory sieving machine according to the vibration generating machine of the invention.

FIG. 1 shows an example of a vibratory sieving machine according to the vibration generating machine of the present invention.

This vibratory sieving machine 1 is designed to convey the object W supplied on a sieving net 2 while vibrating and sieving through the sieving net 2, and it comprises a vibration generating device 3 having two rotary shafts 31*a*, 31*b* provided with eccentric spindles 32*a*, 32*b* disposed parallel to each other in order to applying vibrations to the sieving net 2.

The vibration generating device 3 has motors Ma, Mb disposed so that the two rotary shafts 31*a*, 31*b* may be driven independently, and the rotary drive control mechanism 30 is constituted so as to start up one rotary shaft out of the two rotary shafts 31*a*, 31*b* upon start, and to start the other rotary shaft after the rotary drive state of this rotary shaft is transferred to a stationary state.

Herein, the expression "when the rotary drive state of the rotary shaft is transferred to a stationary state" refers to a moment of reaching the state when the power consumption of the motor suddenly elevates after start of one rotary shaft, then declines gradually until the rotating speed reaches a predetermined speed, thereby converging on a nearly specific value.

Using induction motors for motors Ma, Mb, a specific embodiment is explained herein on a basis of a more specific embodiment, in which two rotary shafts 31*a*, 31*b* are independently driven in reverse directions.

Figure 2:
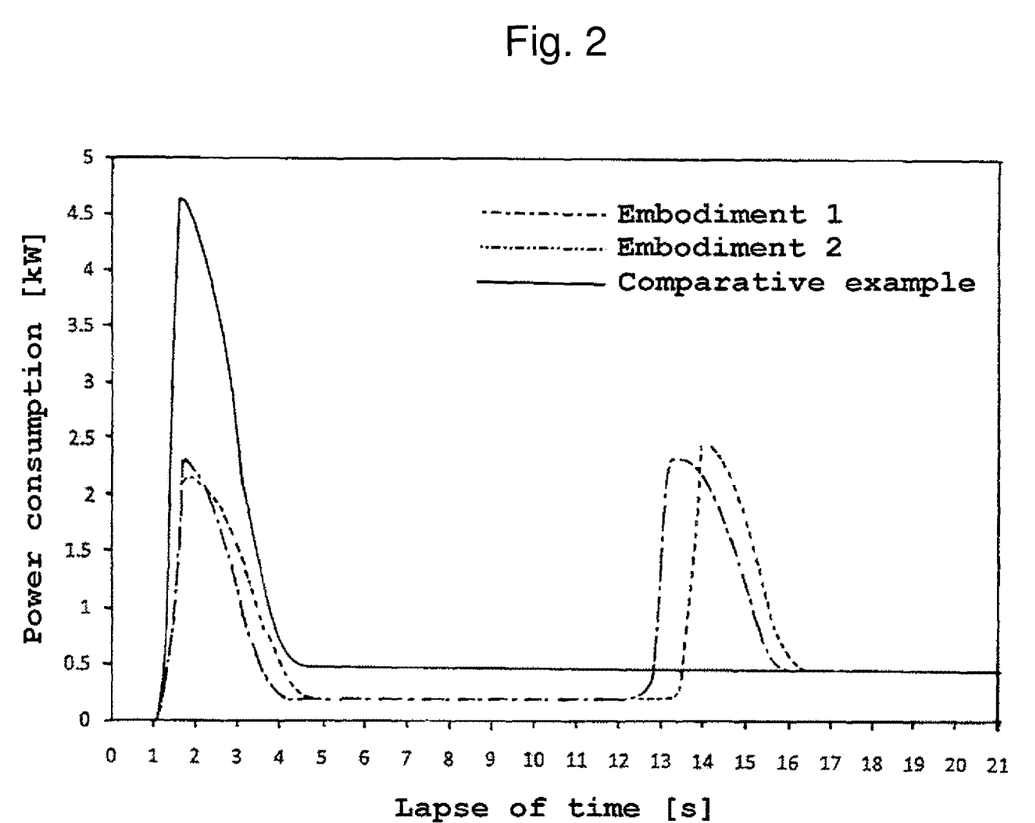
FIG. 2 is a graph showing an exemplary embodiment of the first aspect of the invention, and a comparative example.

FIG. 2 shows the power consumption when either one of the rotary shaft 31*a* (embodiment 1) and the rotary shaft 31*b* (embodiment 2) of the two rotary shafts 31*a*, 31*b* is started upon start, and the other rotary shaft 31*b* (embodiment 1) or the rotary shaft 31*a* (embodiment 2) is started after the rotary drive state of this rotary shaft 31*a* or rotary shaft 31*b* is transferred to a stationary state, or when the both rotary shafts 31*a*, 31*b* are started (comparative example) simultaneously upon start.

In FIG. 2, start of other rotary shaft 31*b* (embodiment 1) or rotary shaft 31*a* (embodiment 2) takes place 12 seconds after start of one rotary shaft 31*a* (embodiment 1) or rotary shaft 31*b* (embodiment 2).

As clear from FIG. 2, it is known that embodiment 1 and 2, as compared with the comparative example can reduce the peak capacity (power consumption) of the motor required for rotating and driving the two rotary shafts 31*a*, 31*b* (that is, the peak capacity of the motors of embodiments 1 and 2 is about 55% of the comparative example), and at the same time, the power consumption of the motors can be reduced.

Meanwhile, if the two motors Ma, Mb are started without synchronism, by the generated vibrations, the motors Ma, Mb can be naturally synchronized in a specified relative phase state.

Accordingly, as the rotary drive control device, by using simple relay circuits or timer circuits, the two motors Ma, Mb are can be started at a specific time difference (12 seconds in the embodiment).

On the other hand, the vibration generating device 3 has motors Ma, Mb disposed so that the two rotary shafts 31*a*, 31*b* may be driven independently, and has the rotary drive control mechanism (not shown) constituted so as to stop transmission of rotary drive force to either one of the two rotary shafts 31*a*, 31*b* upon transfer of the two rotary shafts 31*a*, 31*b* to a stationary state, and to rotate the rotary motor having stopped the transmission of the rotary drive force in cooperation with the other rotary shaft having stopped the transmission of the rotary drive force.

Herein, the expression "when the rotary drive state of the rotary shaft is transferred to a stationary state" refers to a moment of reaching the state when the power consumption of the motor suddenly elevates after start of one rotary shaft, then declines gradually until the rotating speed reaches a predetermined speed, thereby converging on a nearly specific value.

Using induction motors for motors Ma, Mb, a specific embodiment is explained herein on a basis of a more specific embodiment, in which two rotary shafts 31a, 31b are independently driven in reverse directions.

Figure 3:
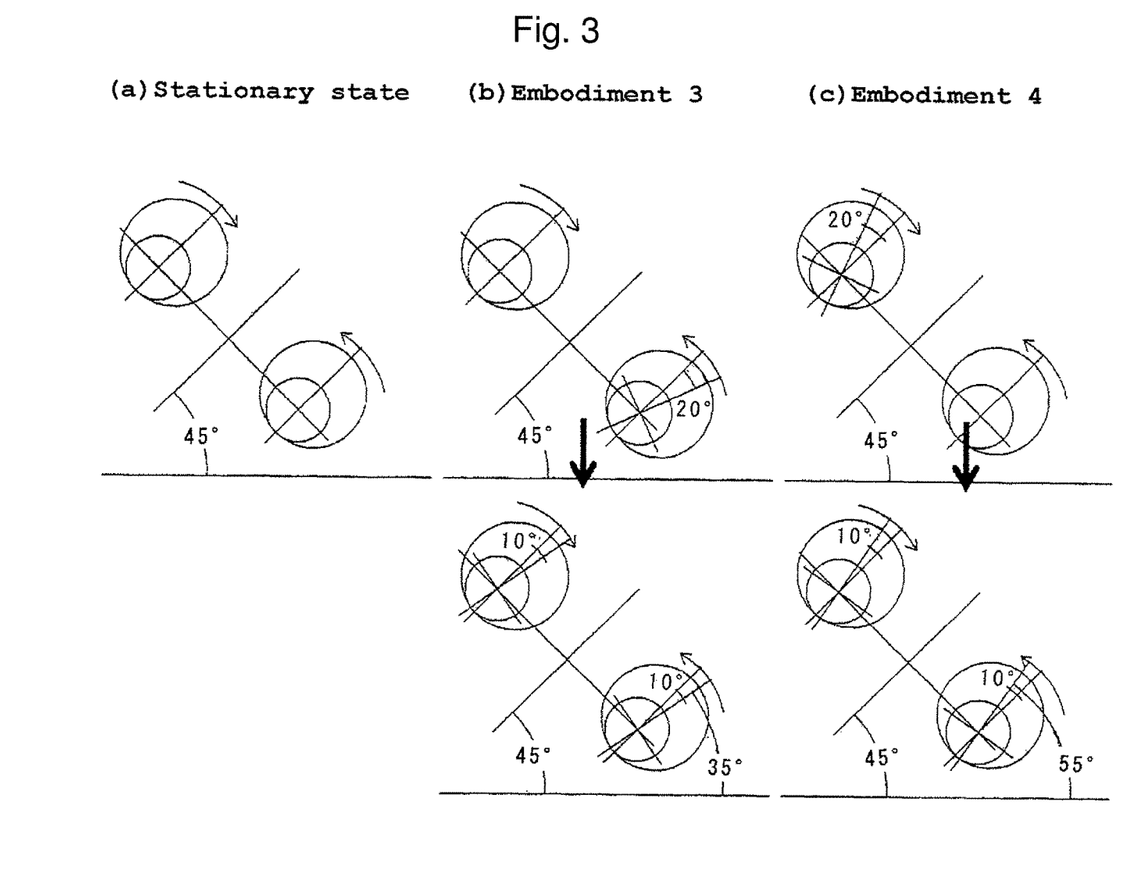
FIG. 3 is an explanatory diagram showing an exemplary embodiment of the second aspect of the invention.

In FIG. 3, after the rotary drive state of the two rotary shafts 31a, 31b is transferred to a stationary state, transmission of rotary drive force to either one of the rotary shafts 31b (embodiment 3) or rotary shaft 31a (embodiment 4) out of the two rotary shafts 31a, 31b is stopped (specifically, to stop either one of the motor Mb (embodiment 3) or the motor Ma (embodiment 4) out of the two motors Ma, Mb, and then the rotary shaft 31b or rotary shaft 31a having stopped the transmission of the rotary drive force is rotated in cooperation with the other rotary shaft 31a or rotary shaft 31b by the vibration generated by rotary drive of the rotary shaft 31a or rotary shaft 31b due to other motor Ma or motor Mb.

As shown in FIG. 3, as compared with the angle of the vibrating direction being in a stationary state (45° to the horizontal plane) of the rotary drive state of the two rotary shafts 31a, 31b, in the case of embodiment 3, since the rotary shaft 31b having stopped the transmission of rotary drive force is rotated along behind the rotary shaft 31b being rotated and driven, and thereby approaching the horizontal direction (35° to the horizontal plane), and therefore in the case of embodiment 4, since the rotary shaft 31a having stopped transmission of the rotary drive force is rotated along behind the rotated and driven rotary shaft 31b, and thereby approaches in the vertical direction (55° to the horizontal plane).

It is therefore known that the power consumption of the motors Ma, Mb can be decreased by about 15% as compared with the conventional case of rotating and driving the two rotary shafts 31a, 31b.

In the operating method of embodiment 3 and embodiment 4, in addition to the reduction of power consumption of motors Ma, Mb, owing to the difference in the angle of vibrating direction, the sieving operation of the vibratory sieving machine 1 can be selected, so that the sieving efficiency may be enhanced.

In other words, in the operating method of embodiment 3, since the angle of the vibrating direction is closer to the horizontal direction (35° to the horizontal plane), as compared with the stationary state (45° to the horizontal plane), the sieving operation is in the relation of [conveying force>sieving force], whereas in the operating method of embodiment 4, since the angle of the vibrating direction is closer to the horizontal direction (55° to the horizontal plane), as compared with the stationary state (45° to the horizontal plane), the sieving operation is in the relation of [sieving force]>[conveying force].

Incidentally, by making use of difference in the sieving operation due to the angle of the vibrating direction, for example, after the rotary drive state of the two rotary shafts 31a, 31b is transferred to a stationary state, by the operating method of embodiment 3, the convey prior sieving operation of [conveying force>sieving force] is executed, and while performing the transportation of the object W supplied on the sieving net 2 of the vibratory sieving machine 1, periodically, and operation is changed over to the operating method of embodiment 4 (in this case, as required, the operation may be interrupted by the operating method of driving the two rotary shafts 31a, 31b), and by conducting the sieving prior sieving operation of [sieving force>conveying force], it is possible to sieve by applying a large vibration on the work W by way of the sieving net 2.

Since the operating method of embodiment 4 causes the angle of the vibrating direction to be closer to the perpendicular direction (55° to the horizontal plane), it is effective to function to maintain the sieving function of the sieving net 2 by poking into the meshes of the sieving net 2, or scraping off the object W of the broken meshes by vibrations.

Herein, it is enough to stop either one of the two motors Ma, Mb, as the rotary drive control mechanism, simple relay circuits or timer circuits may be used, and driving of the two motors Ma, Mb may be controlled.

Stopping of either one of the two motors Ma, Mb may be done either continuously or intermittently.

As shown in FIG. 3, meanwhile, as for the angle of the vibrating direction, in order to maintain the rotary drive state of the two rotary shafts 31a, 31b in a stationary state, the two rotary shafts 31a, 31b may be started simultaneously, but, instead, upon start, either one rotary shaft of the two rotary shafts 31a, 31b may be started, and the other rotary shaft may be started after the rotary drive state of this rotary shaft is transferred to a stationary state.

Incidentally, the angle of the vibrating direction may be set at an arbitrary angle by adjusting the angle formed by the plane including the central axis of the two rotary shafts 31a, 31b, with the horizontal plane, for example, at ±15°, ±30° across 45° to the horizontal plane.

The period of generation of vibration may be set in an arbitrary period depending on the rotating speed of the two rotary shafts 31a, 31b (specifically by the rotating speed of the two motors Ma, Mb).

Figure 4:
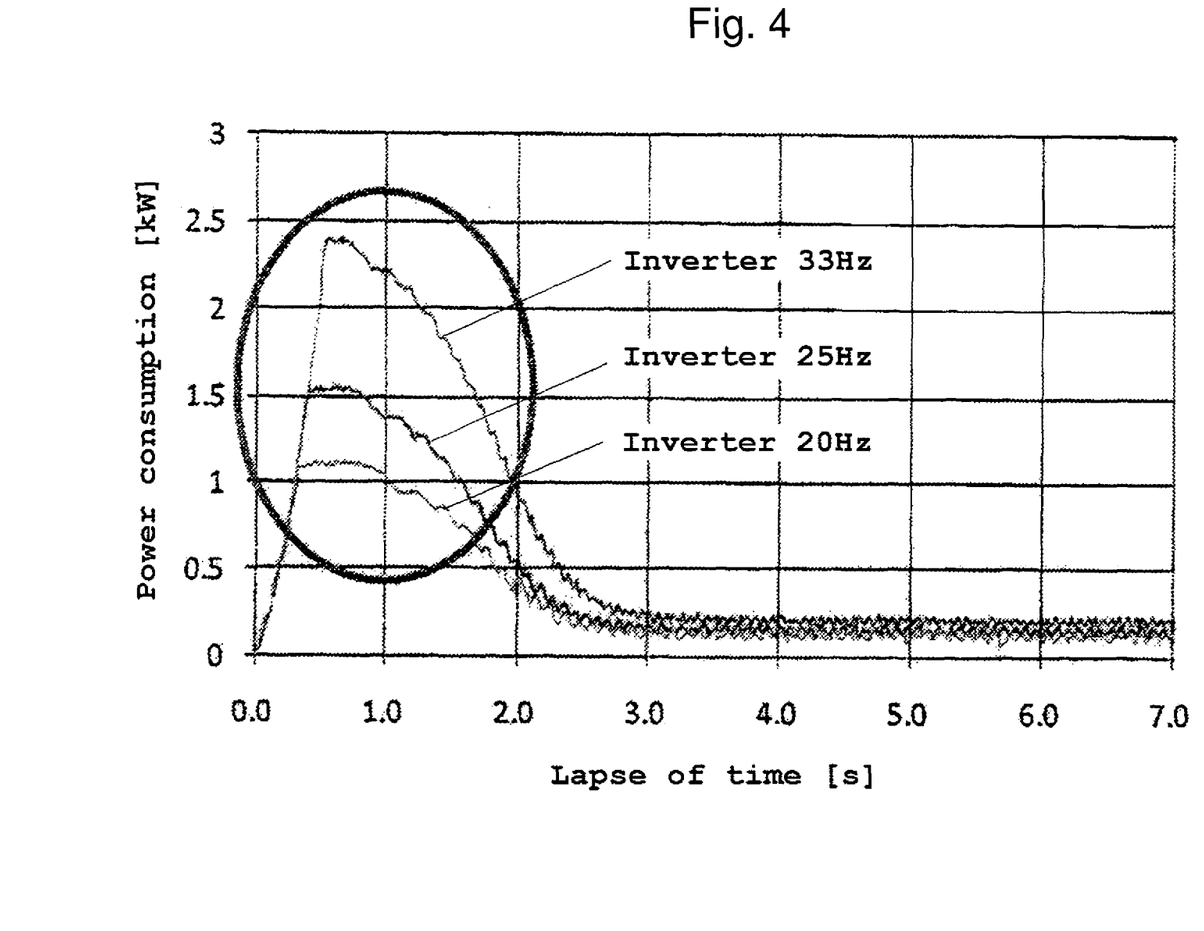
FIG. 4 is a graph showing the relationship between rotating speed and power consumption of a motor.

Herein, as shown in FIG. 4, a positive phase relationship is established among the rotating speed and power consumption of the two motors Ma, Mb.

Traces of generated vibrating directions may be either linear, or elliptical, for example, by providing with a difference in the mass or the eccentric amount of the eccentric spindles 32a, 32b of the two rotary shafts 31a, 31b.

Figure 5:
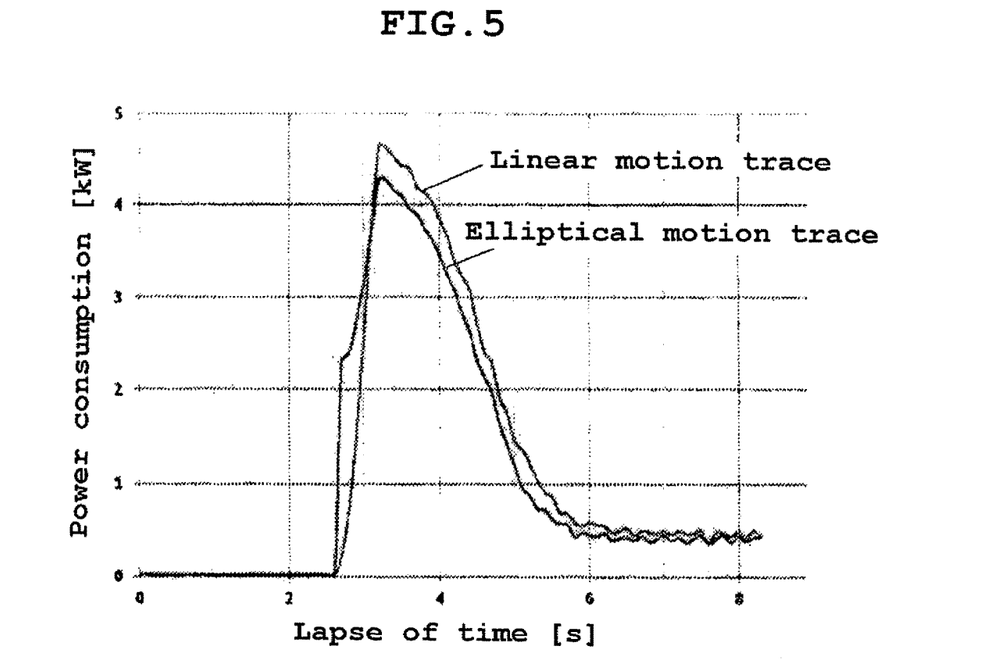
FIG. 5 is a graph showing the relationship between traces of vibrating direction and power consumption.

Herein, as clarified by the relation between the traces of the vibrating diction being generated and the power consumption shown in FIG. 5, it is learned that the power consumption is smaller in the elliptical profile than in the linear profile (about 7% upon start (peak) of the rotary shaft, about 2% upon migration of the rotary drive state of the rotary shaft to a stationary state).

Figure 6:
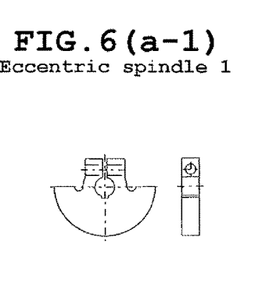
Figure 6B:
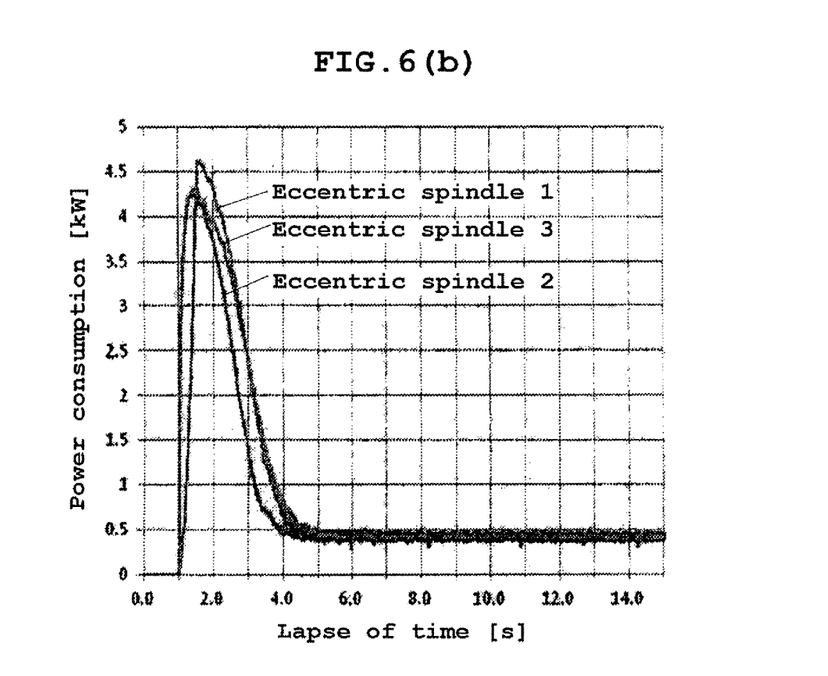

As eccentric spindles, usually, semicircular eccentric spindles or circular eccentric spindles having the rotary axis deviated from the center as shown in FIG. 6 (a-1) are widely used, or as shown in FIG. 6 (a-2) or (a-3), rectangular eccentric spindles may be also used.

Further, referring to Table 1 and FIG. 6 (b), as evident from the results of the experiment conducted by using eccentric spindles having the magnitude of the vibration to be generated at same values, the rectangular eccentric spindles shown in FIGS. 6 (a-2) and (a-3) is capable of reducing the capacity of the peak of the motor required for starting the rotary shaft as compared with the semicircular eccentric spindle shown in FIG. 6 (a-1), so that it is found that the power consumption of the motor can be decreased.

TABLE 1

| Eccentric spindle | Starting peak power (ratio to eccentric spindle 1) [%] |
| --- | --- |
| Eccentric spindle 1 (semicircular) | 100 |

TABLE 1-continued

| Eccentric spindle | Starting peak power (ratio to eccentric spindle 1) [%] |
|---|---|
| Eccentric spindle 2 (rectangular) | 91 |
| Eccentric spindle 3 (rectangular) | 93 |

Figures 7A, 7B:
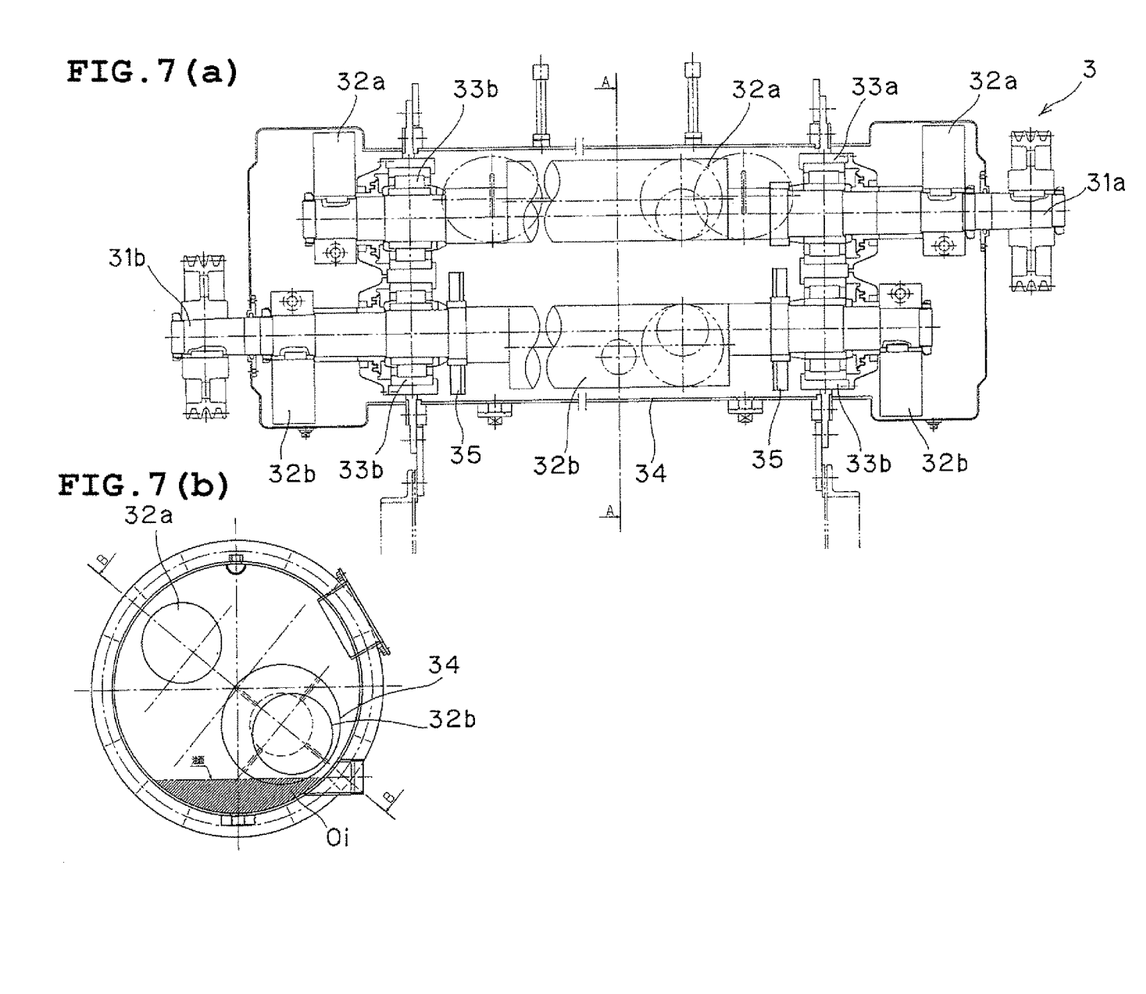
FIG. 7 is an explanatory diagram showing an example of using a lubricating oil collar in the mechanism for supplying lubricating oil into the bearing of the rotary shaft by using a vibratory pump, in which (a) is a longitudinal sectional view (B-B section diagram of (b)), and (b) is a lateral sectional view (A-A section diagram of (a)).

Incidentally, as shown in FIG. 7, in the vibration generating device of this kind, for lubrication of the bearings 33a, 33b of the rotary shafts 31a, 31b provided with eccentric spindles 32a, 32b, lubricating oil Oi is reserved in a casing 34 accommodating the eccentric spindles 32a, 32b, and this lubricating oil Oi is sprinkled over the bearings 32a, 32b by scooping up in synchronism with the rotation of the rotary shaft 31b by a cylindrical lubricating oil collar 35 affixed on the rotary shaft 31b.

However, this lubricating method has a problem of causing an energy loss due to generation of resistance force while the lubricating oil collar 35 moves in the reserved lubricating oil Oi.

Figure 8:
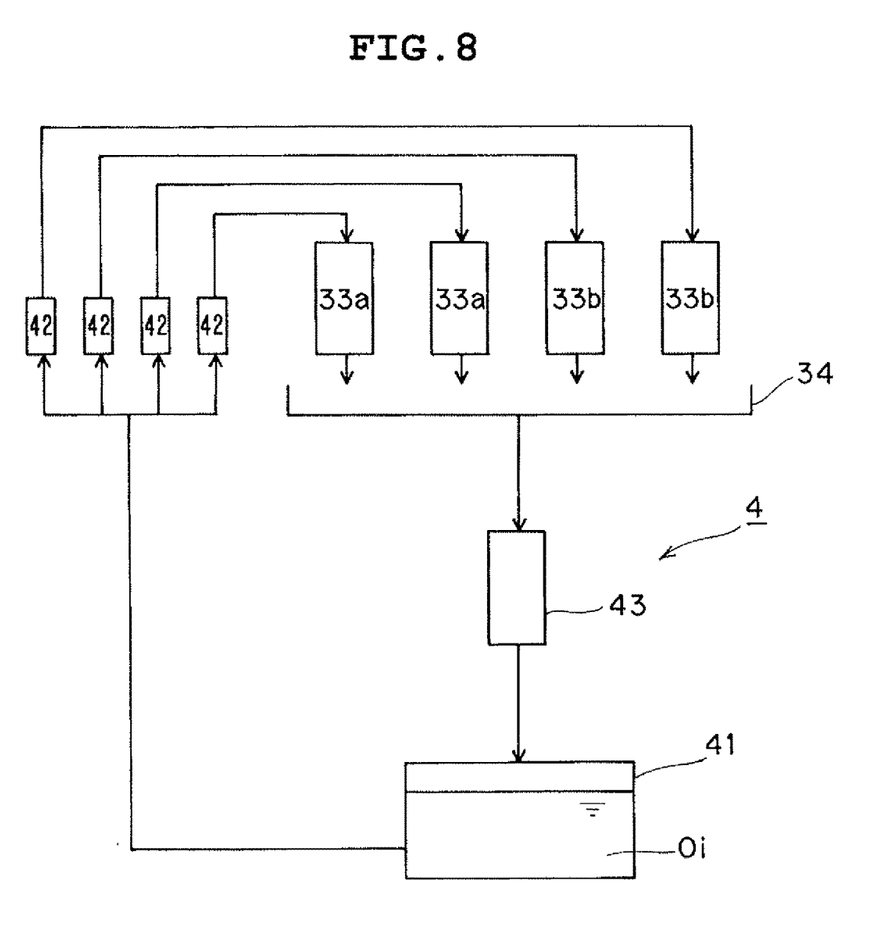
FIG. 8 is an explanatory diagram showing an example of using a vibratory pump in the mechanism for supplying lubricating oil into the bearing of the rotary shaft by using a vibratory pump.

To cope with this problem, as shown in FIG. 8, it may be designed to supply lubricating oil Oi into the bearings 33a, 33b of the rotary shafts 31a, 31b by way of a vibratory pump 42 from the reservoir unit 41 of lubricating oil Oi, so that the lubricating oil Oi supplied in the bearings 33a, 33b may be sent back to the reservoir unit 41, by way of a strainer 43 for removing foreign matter in the casing 34 and in the lubricating oil Oi.

Figure 9:
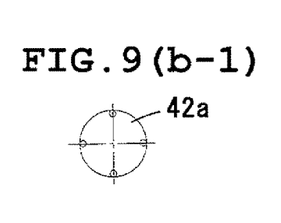
FIG. 9 is an explanatory diagram of a vibratory pump, in which (a) is a sectional view of the vibratory pump, (b-1) is a plan view of a valve disc of the vibratory pump, (b-2) is a front view thereof, and (c) is a stroke explanatory diagram of the vibratory pump.
Figure 9A:
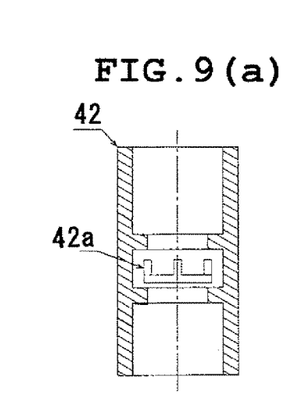
Figure 9C:
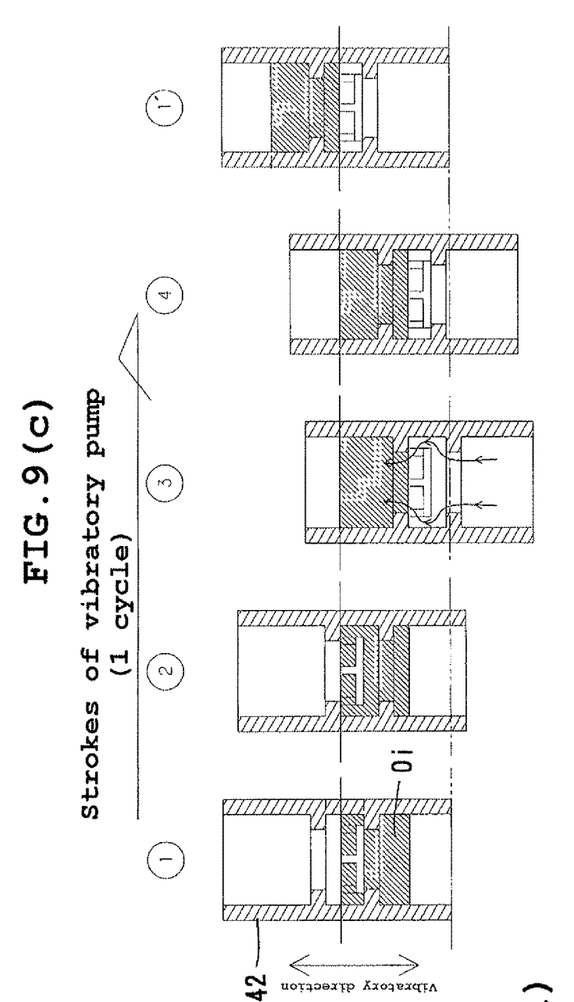

Herein, the vibratory pump 42 is provided with, as shown in FIG. 9, a valve disk 42a moved by receiving vibrations in the inside, and therefore the lubricating oil Oi reserved in the reservoir unit 41 is sent out intermittently from one side to another by the valve disk 42a moved reciprocally by receiving the vibration generated by the vibration generation device 3, and is thereby supplied into the bearings 33a, 33b.

As a result, without requiring another driving source, the lubricating oil Oi can be supplied into the bearings 33a, 33b of the rotary shafts 31a, 31b by using the vibration generated by the vibration generation device 3.

Figure 10:
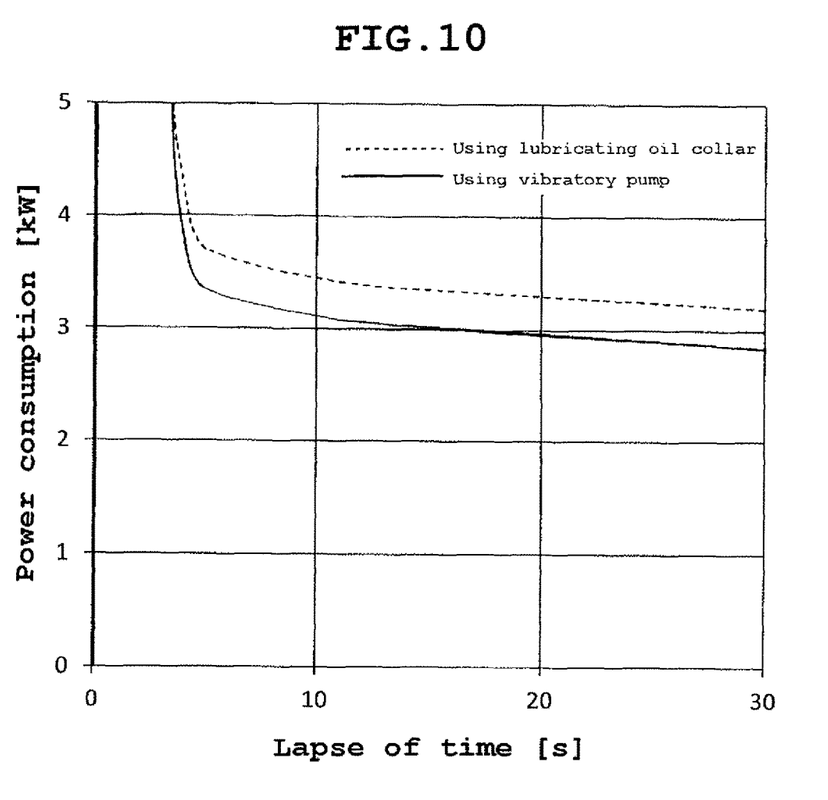
FIG. 10 is a graph showing the relationship of power consumption when using a lubricating oil collar and a vibratory pump.

Then, as clear from the results of the experiment using the lubricating oil collar and the vibratory pump shown in FIG. 10, when using the vibratory pump, as compared with the case of using the lubricating oil collar, it is possible to reduce the power consumption of the motor consumed for rotating and driving the rotary shaft in a stationary state.

Herein, the vibration generation device of the invention is specifically described, and examples of the vibratory sieving machines according to the vibration generation device are also described, but it must be noted that the invention is not limited to the constitution described in these examples or embodiments, but may be changed and modified in various forms within a scope not departing from the true spirit thereof, for example, the constitution comprising plural sets of the vibration generation device of the invention having two rotary shafts provided with eccentric spindles disposed parallel to each other, the plural sets of vibration generation device having common motors, and others.

INDUSTRIAL APPLICABILITY

The vibration generation device of the invention is a vibration generation device having two rotary shafts provided with eccentric spindles disposed parallel to each other, in which the capacity and power consumption of the motors required herein can be decreased, and hence it is suitable for applications as vibratory sieving machine or vibratory piling machine, and it is widely usable in applications of vibration generation devices.

| Description of Reference Numerals | |
|---|---|
| 1 | Vibratory sieving machine |
| 2 | Sieving net |
| 3 | Vibration generation device |
| 31a | Rotary shaft |
| 31b | Rotary shaft |
| 32a | Eccentric spindle |
| 32b | Eccentric spindle |
| Ma | Motor |
| Mb | Motor |
| W | Object |

What is claimed is:

1. A vibratory sieving machine comprising:
a sieving net;
a vibration generating device for vibrating the sieving net;
a vibratory pump;
a reservoir unit; and
a strainer,
wherein the vibration generating device comprises:
a casing,
two rotary shafts with respective eccentric spindles parallel to each other,
motors configured such that that the two rotary shafts can be driven independently,
bearings for the two rotary shafts, and
a rotary drive control mechanism configured such that transmission of a rotary drive force to either one of the two rotary shafts is suspended after a rotary drive state of the two rotary shafts is transferred to a stationary state, and further configured such that the one of the two rotary shafts for which the transmission of the rotary drive force has been suspended is rotated along with cooperation of the other of the two rotary shafts vibrated by generation of the rotary drive force of the other of the two rotary shafts,
wherein selection of the one of the two rotary shafts for suspending transmission of the rotary drive force causes a difference in an angle of a vibrating direction, and the angle of the vibrating direction is set by adjusting an angle defined by a plane including a central axis of the two rotary shafts with a horizontal plane,
wherein the vibratory pump is configured to supply lubricating oil into the bearings from the reservoir unit such that the lubricating oil supplied in the bearings is sent back to the reservoir unit through the strainer for removing foreign matter in the casing and in the lubricating oil, and
wherein the vibratory pump includes a valve disk configured to be reciprocally moved by receiving vibrations generated by the vibration generation device such that the lubricating oil reserved in the reservoir unit is sent out intermittently from one side to another and is thereby supplied into the bearings.

2. The vibratory sieving machine according to claim 1, wherein the rotary drive control mechanism is configured such that the one of the two rotary shafts is started upon a start, while the other of the two rotary shafts is started after the rotary drive state of the one of the two rotary shafts is transferred to the stationary state.

3. The vibratory sieving machine according to claim 2, wherein the eccentric spindles are rectangular eccentric spindles.

4. The vibratory sieving machine according to claim 1, wherein the eccentric spindles are rectangular eccentric spindles.

* * * * *